June 19, 1928.

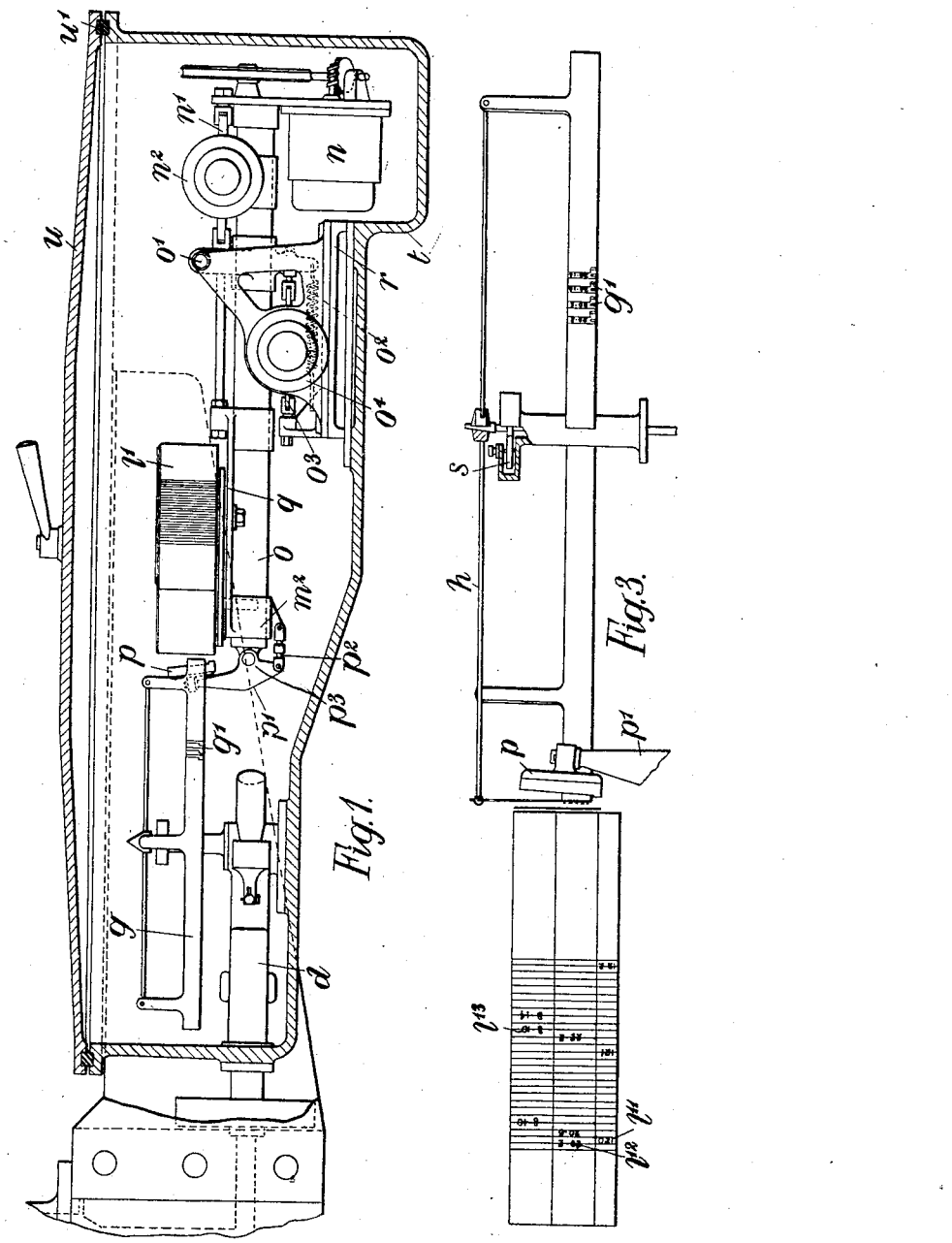

F. S. TUCKETT 1,674,380

LOAD WEIGHING MEANS FOR LIFTS, CRANES, HOISTS,
AND THE LIKE LIFTING APPARATUS

Filed Nov. 28, 1927   3 Sheets-Sheet 2

F. S. Tuckett
INVENTOR

By Marks & Clerk
Attys.

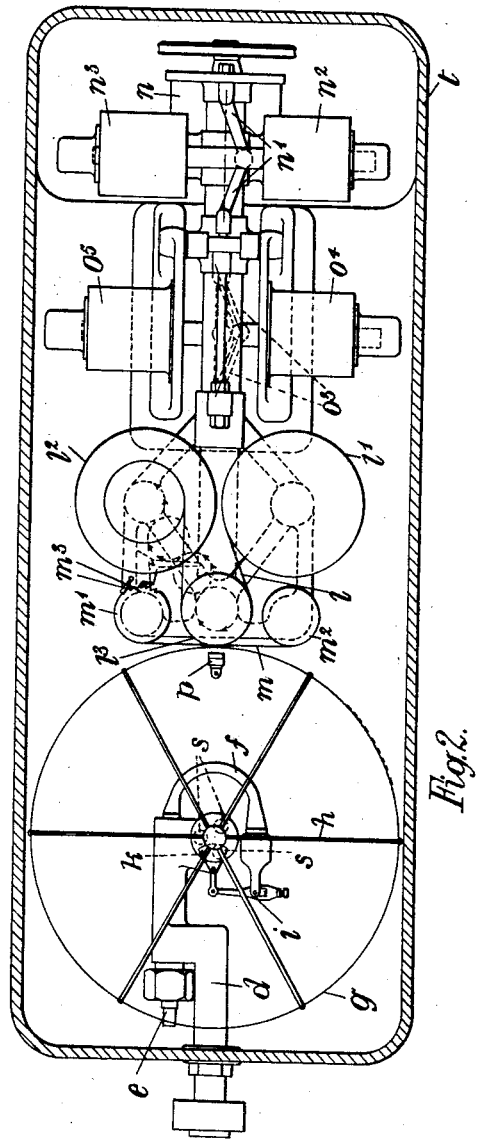

Patented June 19, 1928.

1,674,380

UNITED STATES PATENT OFFICE.

FREDERICK SYDNEY TUCKETT, OF LONDON, ENGLAND.

LOAD-WEIGHING MEANS FOR LIFTS, CRANES, HOISTS, AND THE LIKE LIFTING APPARATUS.

Application filed November 28, 1927, Serial No. 236,323, and in Great Britain September 24, 1926.

This invention relates to goods and other lifts, cranes, hoists and other like elevating devices and weighing machines, and has for its object to provide improved means whereby the weight of the load to be lifted or weighed may be readily indicated and if desired permanently recorded.

The invention consists in a lift, crane, hoist or other like device in which there is interposed between the lifting wire, lifting ram or other lifting member and the cage, wagon, truck or other device being lifted, a cylinder containing oil or other fluid and a piston working therein combined with means for hydrostatically setting ready for operation a recording device which is operated by electrical, pneumatic or other suitable means independent of the setting means.

The invention also consists in the combination with a weighing machine of a recording device adapted to be set for recording in accordance with the weight by hydrostatic means and to be operated electrically, pneumatically or otherwise by means independent of the setting means.

The invention also consists in other details and arrangements hereinafter described or indicated.

The accompanying drawings illustrate one mode of carrying out the invention.

Figures 1 and 1ª show in elevation partly in section one form of apparatus in accordance with the invention applicable to a lift or other like device.

Figure 2 is a plan of a part of Figure 1 with parts removed and

Figure 3 is a more or less diagrammatic view showing how the apparatus is intended to operate.

Figure 1A:
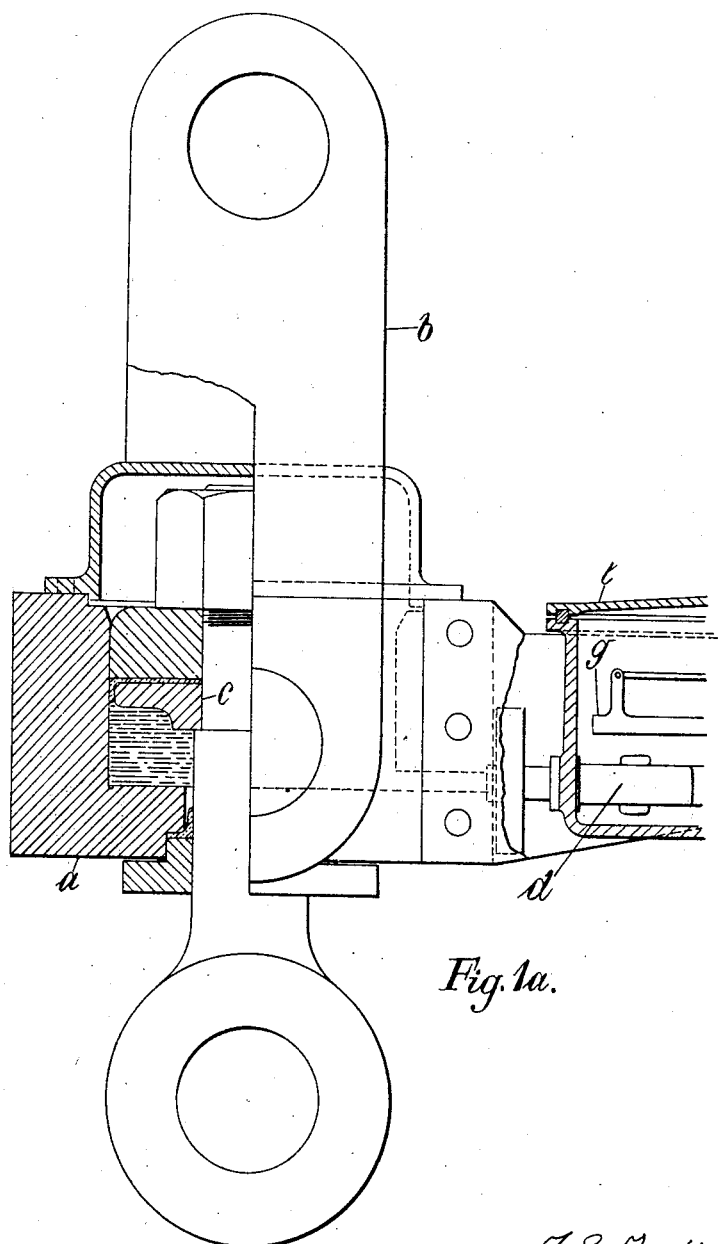

In carrying my invention into effect in one convenient manner as, for example, in its application to a goods lift operated pneumatically hydraulically, electrically or mechanically, I provide an oil chamber or the like $a$ secured to the suspension link or links $b$ or other lifting devices (or to the cage or other means to be lifted) and a piston $c$ working within said cylinder and secured to the cage or the like to be lifted (or to the lifting wire suspension links or other like means), the arrangement in either case being such that when the weight is being lifted a pressure will be set up within the oil chamber determined by the weight being lifted and this pressure may be measured by a suitable pressure gauge connected in any convenient manner with the interior of the cylinder.

In the practical application of my invention I provide means for obtaining a permanent record of the weights found or indicated by the hydrostatic weighing means described and it will be understood that any convenient form of recorder capable of being set by hydrostatic pressure will be suitable for the purpose and is to be considered as falling within the scope of the invention.

In the specific example illustrated the interior of the oil chamber is connected through a suitable pipe connection $d$ (preferably having a regulating valve $e$ therein) with a Bourdon or like pressure tube $f$, the free end of which is suitably connected to a movable dial or other like pressure indicator.

In the drawings the dial takes the form of a tape $g$ of aluminium or duralumin or other suitable material having graduations $g'$ thereon in tons and cwts. or other units of weight, the dial ribbon or tape being carried upon a spider or other framework $h$ suitably mounted for rotation and adapted to be actuated by movement of the pressure tube through the intermediary of a link connection $i$ and quadrant member $k$ acting upon a pinion adapted to rotate the dial. If desired, there may be a certain amount of lost motion (which may or may not be adjustable) between the free end of the pressure tube and the link member $i$ so that the apparatus will absorb a predetermined load (for example the load of the cradle) before the dial commences to move.

Any convenient means may be adopted if necessary or desirable for facilitating visual inspection of the dial for the purpose of obtaining a visible indication of the weight but I prefer to provide means whereby a permanent record of the weight may be obtained and for this purpose according to the construction shown in the drawing I provide in conjunction with the pressure dial a paper strip $l$ associated with a feed roller $l'$ and take-up roller $l^2$ and an ink ribbon or the like $m$ also associated with its feed and take-up rollers $m'$ $m^2$, both passing over the intermediate roller $l^3$.

The paper strip is adapted to be fed at a predetermined rate by means of a clockwork or other motor $n$ and suitable intervening gearing, the arrangement being such that a given length of paper passes the dial in one hour or other unit of time, such length of paper being marked to indicate hours and minutes or other units as shown at $l^{11}$ in Figure 3.

The paper and ink ribbon with their rollers and driving mechanism are mounted upon a carriage $q$ slidable upon an arm $o$ under the action of a toggle link mechanism $n'$ controlled by the solenoid $n^2$ $n^3$, the arrangement being such that when the toggle link $n'$ is straightened out under the action of the solenoids the carriage $q$ is moved towards the dial as is also the internal pad or anvil member $p$ carried upon a lever $p'$ connected by an adjustable link $p^2$ with a part of the carriage $q$ and pivoted at $p^3$ upon the end of the arm $o$ so that when the paper and ink ribbon are moved forward towards the dial the latter will be gripped as it were between the paper-carrying mechanism and the pad or anvil $p$ so that an impression of the weight indicated for the time being at the printing position on the dial will be printed upon the paper strip in the manner indicated at $l^{12}$ in Figure 3 which indicates the gross weights printed upon the paper strip.

For the purpose of enabling tare weights or other indications also to be recorded upon the paper strip I provide means by which the relative vertical or lateral positions of the dial $g$ and paper strip may be varied as, for example, the arm $o$ is pivoted at $o'$ upon a framework $r$ and is adapted to be controlled against the action of a spring $o^2$ by a toggle link mechanism $o^3$ controlled by the solenoids $o^4$, $o^5$, the arrangement being such that when the toggle links $o^3$ are in the position indicated by the dotted lines in Figure 2 the arm $o$ is in position for the gross weights to be printed in the position $l^{12}$ (Figure 3), while when the toggle links $o^3$ are straightened out the arm $o$ is depressed about its pivot $o'$ so that the paper-carrying mechanism is lowered in relation to the dial and the latter is then in position (when the solenoids $n^2$ $n^3$ are actuated) to print tare weights or other data as indicated at $l^{13}$ in Figure 3.

The ink ribbon $m$ may be automatically and intermittently fed by the pawl and ratchet mechanism $m^3$ suitably actuated by the movement of the carriage $n^2$ carrying the paper mechanism.

Furthermore, the dial-carrying frame $h$ may be guided in its rotary movement by means of the rollers $s$ engaging the vertical spindle upon which the framework is mounted.

The whole of the recording mechanism is conveniently located in a box or casing $t$ which may be fitted with a suitable cover $u$ and rendered completely watertight by means of rubber or other packing $u'$ inserted between the box or casing and its cover.

Suitable switching arrangements may be provided for the purposes of actuating the various solenoids when desired, such actuation being effected either by hand or automatically by a suitable controller or other devices operated by movement of the load-carrying member or other movable part of the apparatus.

It is to be understood that the invention may be applied with equal effect and like advantage to any form of lifting contrivance and is not to be limited to the particular means hereinbefore described by way of example for obtaining an indication of the weight since any suitable pressure indicating means may be employed for the purpose and, further, the actual forms of recording mechanism described are given by way of example only as I may adopt any other means in conjunction with the weight-indicating device to obtain a record of the weight when such is desirable and such recording means may be in accordance with the invention suitably combined with any weight-indicating or hydrostatic weighing mechanism.

I claim—

1. A weight-measuring device, comprising a weight-supporting member, hydrostatic means operatively connected thereto, a recording device adapted to be set for recording by said hydrostatic means, and remotely controlled means adapted to actuate the recording device to obtain indication of the weight to be measured.

2. A weight-measuring device comprising a weight-supporting member, hydrostatic means operatively connected thereto, a recording device comprising two members adapted to be moved relatively to one another by said hydrostatic means, remotely controlled means adapted to actuate the recording device to obtain a record of the weight to be measured.

3. A weight-measuring device comprising a weight-supporting member, a recording device comprising a member bearing numerals indicative of weight and a further member adapted to receive an impress from said numerals, hydrostatic means operatively connected with the weight-supporting member and adapted to cause relative movement between the two members of the recording device, and remotely controlled means to record the weight upon said further member.

4. A weight-measuring and lifting device having a dial bearing numerals indicative of weight, a strip in close proximity thereto, hydrostatic means adapted to cause relative movement between the dial and the strip in accordance with the weight to be measured, and remotely controlled means adapted to record the weight on the strip.

5. A weight-measuring and lifting device having a weight-supporting member, a hydrostatic device operatively connected thereto and comprising a cylinder containing fluid and a piston adapted to work therein, a recording device comprising two movable members adapted to be moved relatively to one another by said fluid in accordance with the weight to be measured, and remotely controlled means adapted to cause contact between the movable members to record the weight upon one thereof.

6. A weight-measuring and recording device having a weight-supporting member, hydrostatic means operatively connected thereto, a rotatable member bearing numerals indicative of weight and adapted to be rotated by said hydrostatic means, a movable strip in close proximity to the rotatable member, and remotely controlled means adapted to press the rotatable member and the strip together.

7. A weight-measuring and recording device according to claim 6 in which the remotely controlled means comprise an electromagnetic arrangement adapted to be operated from a distance.

8. A weight-measuring and recording device having a weight-supporting member, hydrostatic means operatively connected thereto, a rotatable member bearing numerals indicative of weight and adapted to be rotated by said hydrostatic means, a movable strip in close proximity to the rotative member, operative means adapted to press the rotatable member and the strip together, and means adapted to move the strip laterally with respect to the rotatable member whereby records may be made in a plurality of columns.

9. A weight-measuring and recording device having a weight-supporting member, hydrostatic means operatively connected thereto, a wheel bearing numerals indicative of weight and adapted to be rotated by said hydrostatic means, a movable strip in close proximity to the wheel and an anvil member in close proximity to the contiguous portions of the strip and wheel, and remotely controlled means adapted to compress together a portion of the wheel, the anvil member and a portion of the strip.

10. A weight-measuring and recording device according to claim 9 in which the strip is carried by a plurality of roller members mounted on a carriage, the remotely controlled means being adapted to move said carriage.

11. A device according to claim 9 having further remotely controlled means adapted to cause movement of the strip substantially parallel to the axis of the wheel.

12. A weight-measuring and recording device having a weight-supporting member, hydrostatic means operatively connected thereto, a wheel bearing numerals indicative of weight and adapted to be rotated by said hydrostatic means, a carriage carrying a strip in close proximity to a circumferential portion of the wheel, operative means comprising toggle link members adapted to move said strip into contact with the contiguous portion of the wheel.

13. A device according to claim 12 having further toggle link members adapted to move the carriage in a direction parallel to the axis of the wheel.

14. A device according to claim 12 comprising electromagnetic devices adapted to be remotely controlled to actuate the toggle link members.

15. A device according to claim 12 having an anvil member adapted to compress said strip upon said wheel upon operation of said toggle link members.

16. A weight-measuring and recording device comprising a weight-supporting member, a piston connected thereto, a cylinder for said piston and containing fluid, a recording device comprising a wheel carrying numerical members and adapted to be rotated by means of said fluid, a paper strip located upon a carriage in close proximity to the wheel, an ink ribbon on one side of said strip, toggle link members adapted to move said carriage towards the wheel and actuated by remotely controlled means, and means adapted to move said carriage in a direction parallel to the axis of the wheel.

17. A device according to claim 16 having an anvil member adapted to contact with the portion of the wheel contiguous to said strip and on the opposite side thereof from said strip.

18. A device according to claim 16 in which the means adapted to move the carriage parallel to the axis of the wheel comprises toggle link members actuated by electromagnetic means.

19. A device according to claim 16 in which the remotely controlled means comprise solenoids controlled from a distant point.

In testimony whereof I have signed my name to this specification.

FREDERICK SYDNEY TUCKETT.